United States Patent [19]
Vorderbruggen et al.

[11] Patent Number: 6,117,364
[45] Date of Patent: Sep. 12, 2000

[54] ACID CORROSION INHIBITOR

[75] Inventors: Mark A. Vorderbruggen, Spring; Dennis A. Williams, Houston, both of Tex.

[73] Assignee: Nalco/Exxon Energy Chemicals, L.P., Sugar Land, Tex.

[21] Appl. No.: 09/321,240

[22] Filed: May 27, 1999

[51] Int. Cl.[7] .............................. C23F 11/00; C09K 3/00
[52] U.S. Cl. ........................ 252/395; 252/396; 507/939; 507/934; 507/263; 507/268; 507/252; 507/254; 507/255; 507/256; 507/257; 507/258; 507/259
[58] Field of Search .................................. 252/395, 396; 507/939, 934, 263, 268, 252, 254, 255, 256, 257, 258, 259

[56] References Cited

U.S. PATENT DOCUMENTS

| | | |
|---|---|---|
| 3,589,860 | 6/1971 | Foroulis . |
| 3,779,935 | 12/1973 | McDougall et al. . |
| 4,028,268 | 6/1977 | Sullivan, III et al. . |
| 4,444,668 | 4/1984 | Walker et al. . |
| 4,498,997 | 2/1985 | Walker . |
| 4,522,658 | 6/1985 | Walker . |
| 4,552,672 | 11/1985 | Walker . |
| 4,734,259 | 3/1988 | Frenier et al. . |
| 4,980,074 | 12/1990 | Henson et al. ........................... 507/939 |
| 5,120,471 | 6/1992 | Jasinski et al. .......................... 252/396 |
| 5,366,643 | 11/1994 | Walker ..................................... 507/939 |
| 5,543,388 | 8/1996 | Williams et al. . |
| 5,763,368 | 6/1998 | Brezinski ................................. 507/939 |
| 5,854,180 | 12/1998 | Scherubel et al. ....................... 252/396 |
| 5,976,416 | 11/1999 | Brezinski ................................. 252/395 |

*Primary Examiner*—Philip Tucker
*Attorney, Agent, or Firm*—Kelly L. Cummings; Thomas M. Breininger

[57] ABSTRACT

An acid corrosion inhibitor composition is provided for petroleum wells and water wells subjected to stimulation with acid solutions. The inhibitor combines cinnamaldehyde and an organo-sulfur compound. The inhibitor provides a reduced rate of corrosion and fewer instances of pitting than inhibitors which include cinnamaldehyde alone. The inhibitor does not suffer from the well-known oil field aldehyde/polyacrylamide crosslinking incompatibility. The enhanced performance by the inhibitor of the present invention is provided by a synergistic action between the cinnamaldehyde and an organo-sulfur compound.

15 Claims, 1 Drawing Sheet

Comparison of Inhibitor #1 and #4 in 28% HCL at 275 F

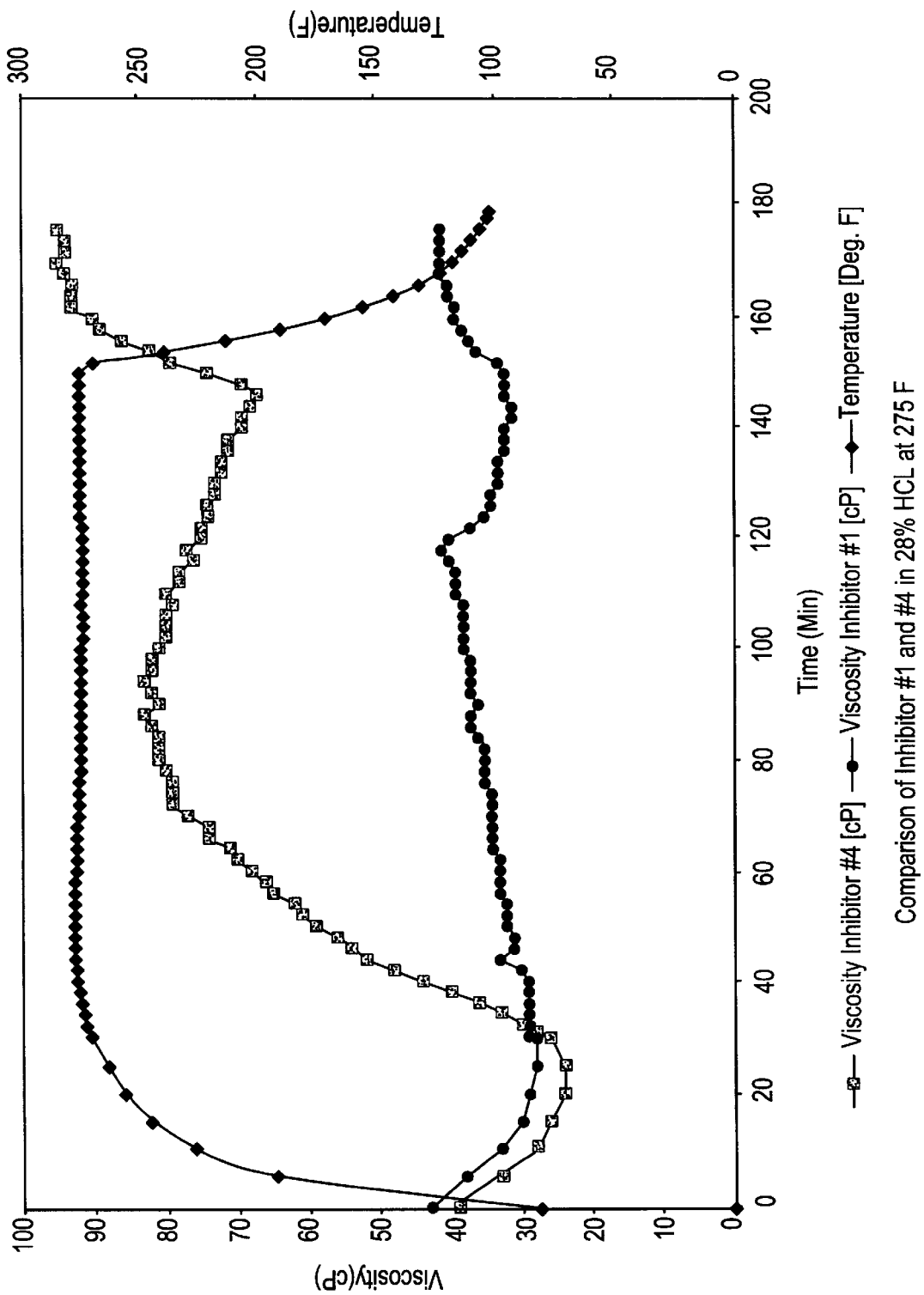

ACID CORROSION INHIBITOR

BACKGROUND OF THE INVENTION

The present invention relates generally to inhibitors for reducing or eliminating corrosion of steel by acid. More specifically, the present invention relates generally to inhibitors for reducing the corrosion of oil field chrome and carbon steels by acids.

Acid solutions are commonly used to stimulate production in oil wells, gas wells and water wells in subterranean formations. Such acid stimulations are used in conjunction with hydraulic fracturing techniques and matrix acid stimulations. In both the acid fracturing and matrix acid stimulation techniques, the well treatment acid solutions are pumped through the well casing and injected into the formation. The acid then attacks the formation and increases the permeability of the formation thereby stimulating the flow of oil, gas or water. The acids typically used include hydrochloric acid, hydrofluoric acid, acetic acid, formic acid and mixtures thereof.

In order to protect the well casing and other steel tubular goods in the well from the corrosive effects of the acid, the acid solutions typically include a corrosion inhibitor, commonly referred to as an acid corrosion inhibitor ("ACI"). Typical inhibitors include nitrogen containing compounds such as those described in U.S. Pat. No. 4,028,268, or acetylenic compounds as described in U.S. Pat. Nos. 3,779, 935, 4,552,672, 4,498,997, 4,444,668 and 4,522,658. Often, mixtures of inhibitors can be employed. In addition, cinnamaldehyde may also be used, as set forth in U.S. Pat. Nos. 3,589,860 and 4,734,259.

It is also known that iodine can assist in corrosion inhibition. A combination of iodine in the acid corrosion inhibitor blend as well as potassium iodide added directly to the acid is illustrated in U.S. Pat. No. 5,543,388.

However, it is also well known that none of the currently available acid corrosion inhibitors, or their combination with elemental iodine or potassium iodide, completely stop corrosion from the commonly employed well treatment acid solutions. Furthermore, there is a well-known crosslinking incompatibility between prior art aldehyde-based acid corrosion inhibitors and polyacrylamide-based acid-gel systems. While the currently employed acid corrosion inhibitors, with or without iodine, limit corrosion, corrosion still occurs to the detriment of steel equipment installed in the wells which limits the useful life of the equipment and re-use thereof in future wells.

Accordingly, there is a need for improved acid corrosion inhibiting compositions which substantially limits corrosion of carbon and chrome steel goods when exposed to acidic solutions. Further, there is a need for an improved method of preventing or limiting the corrosion of carbon and chrome steel goods exposed to acid solutions. Furthermore, there is a need for an acid corrosion inhibitor which will not cause crosslinking in polyacrylamide acid gels. Still further, there is a need for improved methods of acid stimulation of oil, gas and water wells which limits the corrosive effects of the stimulations on chrome and carbon steel components utilized in the wells.

SUMMARY OF THE INVENTION

The present invention satisfies the aforenoted needs by providing a corrosion inhibitor that comprises cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine, cystine, methionine or thiourea. The inventive corrosion inhibitor is of lower toxicity and more environmentally friendly than prior art.

In an embodiment, the corrosion inhibitor is free of alkylphenyl ethoxy compounds such as nonylphenylethoxy compounds.

In an embodiment, the corrosion inhibitor further comprises iodine.

In an embodiment, the corrosion inhibitor further comprises an extender selected from the group consisting of potassium iodide, formic acid and mixtures thereof.

In an embodiment, the corrosion inhibitor further comprises a salt selected from the group consisting of alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline quaternary salt, benzoquinoline quaternary salt, chloromethyl napthalene quaternary salt and mixtures thereof.

In an embodiment, the present invention provides a composition for stimulating production of petroleum and water wells which comprises an acid and a corrosion inhibitor comprising cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine, cystine, methionine and thiourea. The inventive corrosion inhibitor is of lower toxicity and more environmentally friendly than prior art.

In an embodiment, the corrosion inhibitor is free of alkylphenyl ethoxy compounds such as nonylphenylethoxy compounds.

In an embodiment, the composition further comprises iodine.

In an embodiment, the composition further comprises an extender selected from the group consisting of potassium iodide, formic acid and mixtures thereof.

In an embodiment, the acid is selected from the group consisting of hydrochloric acid, hydrofluoric acid, acetic acid, formic acid, sulfamic acid and mixtures thereof.

In an embodiment, the present invention provides a method of stimulating production of petroleum and water wells which comprises injecting a combination of an acidic composition and a corrosion inhibitor into the well, the corrosion inhibitor comprising cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine cystine, methionine or thiourea. The inventive corrosion inhibitor is of lower toxicity and more environmentally friendly than prior art.

In an embodiment, the corrosion inhibitor is free of alkylphenyl ethoxy compounds such as nonylphenylethoxy compounds.

In an embodiment, the combination further comprises iodine.

In an embodiment, the combination further comprises an extender selected from the group consisting of potassium iodide, formic acid and mixtures thereof.

In an embodiment, the acid is selected from the group consisting of hydrochloric acid, hydrofluoric acid, acetic acid, formic acid and mixtures thereof.

In an embodiment, the present invention provides a corrosion inhibitor that comprises an aqueous solution including from about 5% to about 40% cinnamaldehyde, from about 1.0% to about 10% an organo-sulfur compound such as thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine, cystine, methionine or thiourea, from about 5% to about 40% benzyl chloroquinoline quaternary salt, from about 10% to about 30% surfactant, from about 0.15% to about 1.5% iodine and from about 10% to about 50% formic acid.

In an embodiment, the corrosion inhibitor is free of alkylphenyl ethoxy compounds such as nonylphenylethoxy compounds.

In an embodiment, the corrosion inhibitor further comprises a salt selected from the group consisting of alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline quaternary salt, benzoquinoline quaternary salt, chloromethyl napthalene quaternary salt and mixtures thereof.

It is therefore an advantage of the present invention to provide a corrosion inhibitor for protecting chrome and carbon steels in petroleum and water wells from the effects of acid that is more effective than currently-available corrosion inhibitors on at least four different points. First, the prior art requires separate ACI formulations for mineral and organic acids. The present invention needs only one formulation for both acid types. Second, environmental laws of Europe ban use of alkylphenyl ethoxylates. See PARCOM Recommendations of September, 1992; Annex 2 of OSPAR List of Chemicals for Priority Action. The present invention contains no alkylphenyl ethoxylates. Third, well-known crosslinking incompatibility of aldehyde/polyacrylamide co-polymers used for oil field operation does not occur. Fourth, cinnamaldehyde (LD50: 2220 mg/kg) is 10 to 20 times less toxic than the traditional propargyl alcohol (LD50: 50 mg/kg) and ethyl octanol (LD50: 200 mg/kg).

Another advantage of the present invention is to provide an improved method of stimulating petroleum and water wells with acid solutions that constitutes an improvement in at least four respects. First, prior art requires separate ACI formulations for mineral and organic acids. The present invention needs only one formulation for both acid types. Second, environmental laws of Europe ban use of alkylphenyl ethoxylates. See PARCOM Recommendations of September, 1992; Annex 2 of OSPAR List of Chemicals for Priority Action. The present invention contains no alkylphenyl ethoxylates. Third, well-known crosslinking incompatibility of aldehyde/polyacrylamide co-polymers used for oil field operation does not occur. Fourth, cinnamaldehyde (LD50: 2220 mg/kg) is 10 to 20 times less toxic than the traditional propargyl alcohol (LD50: 50 mg/kg) and ethyl octanol (LD50: 200 mg/kg).

Still another advantage of the present invention is to provide an improved corrosion inhibitor based on cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine, cystine, methionine or thiourea.

Other objects and advantages of the invention will become apparent upon reading the following detailed description and appended claims, and upon reference to the accompanying drawings.

BRIEF DESCRIPTION OF THE DRAWING

FIG. 1 illustrates, graphically, the improved compatability of an acid corrosion inhibitor made in accordance with the present invention in comparison to prior art acid corrosion inhibitors.

DETAILED DESCRIPTION OF THE PRESENTLY PREFERRED EMBODIMENTS

The present invention provides an improved corrosion inhibitor which is particularly useful in oil field applications and water wells where production is being stimulated with the use of acid solutions. The corrosion inhibitor of the present invention departs from the prior art in that it combines both cinnamaldehyde and at least one organo-sulfur compound such as thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, sodium thiocyanate, sodium thiosulfate, tetramethylthiuram monosulfide, thiazolidine, thioglycerol, thiolactic acid, cysteine, cystine, methionine or thiourea, in a unique combination. Table 1 illustrates specific formulations for three inhibitors made in accordance with the present invention and one prior art inhibitor.

TABLE 1

Acid Corrosion Inhibitors (ACI) Formulations

| Component | ACI #1 | ACI #2 | ACI #3 | ACI #4 (Prior Art) |
|---|---|---|---|---|
| Alkylpyridine Quat. Salt | 6% | 0% | 6% | 6% |
| Benzyl Chloride Quinoline Quat. Salt | 20% | 20% | 0% | 20% |
| Chloromethyl Napthalene Quat. | 0% | 6% | 15% | 0% |
| Surfactant | 20% | 20% | 20% | 20% |
| Cinnamaldehyde | 15% | 15% | 15% | 15% |
| Iodine | 0.5% | 0.5% | 0.5% | 0.5% |
| Formic acid | 35% | 35% | 40% | 35% |
| Thioethanol | 3.5% | 3.5% | 3.5% | 0% |
| Isopropyl alcohol | 0% | 0% | 0% | 3.5% |

The four inhibitors were tested in a laboratory simulating actual well conditions. Specifically, three different steels utilized in petroleum wells and water wells, Cr13, Cr2205, N80 and QCT (coiled tubing from Quality Tubing Inc. 10303 Sheldon Rd., Houston, Tex. 77049) steels were exposed to hydrochloric acids, hydrochloric/hydrofluoric acid mixtures, acetic acid solutions, formic acid solutions and combination hydrofluoric acid/acetic acid solutions as indicated in the following Tables 2–37. The corrosion rate was measured over a time period of 6 hours and the evidence of pitting was also noted.

Tables 2–37 discuss the results for Cr13, Cr2205, N80 and coiled tubing steel. As shown in Table 2, the inhibitors made in accordance with the present invention (inhibitor numbers 1, 2, and 3) were very superior to the prior art inhibitor (inhibitor number 4) in terms of both corrosion rate and evidence of pitting for Cr13 steel in 10% formic acid.

TABLE 2

| Inhibitor | Deg F. | PSIG | % HCl | % HF | Alternative Acid | gpt[1] ACI | % Formic | ppt[2] KI | Metal | $C_R^{[3]}$ Rate lbs./ft. sq. | Pitting |
|---|---|---|---|---|---|---|---|---|---|---|---|
| ACl 1 | 275 | 3000 | 0 | 0 | 10% Formic | 2 | 0 | 0 | Cr13 | 0.0058 | 0 |
| ACl 1 | 275 | 3000 | 0 | 0 | 10% Formic | 2 | 0 | 0 | Cr13 | 0.0065 | 1 |
| AC1 1 | 275 | 3000 | 0 | 0 | 10% Formic | 2 | 0 | 0 | Cr13 | 0.0106 | 1 |
| ACl 2 | 275 | 3000 | 0 | 0 | 10% Formic | 2 | 0 | 0 | Cr13 | 0.0122 | 1 |
| ACl 3 | 275 | 3000 | 0 | 0 | 10% Formic | 2 | 0 | 0 | Cr13 | 0.0508 | 0 |
| ACl 3 | 275 | 3000 | 0 | 0 | 10% Formic | 2 | 0 | 0 | Cr13 | 0.0708 | 0 |
| ACl 4 | 275 | 3000 | 0 | 0 | 10% Formic | 2 | 0 | 0 | Cr13 | 0.4069 | 3 |
| ACl 4 | 275 | 3000 | 0 | 0 | 10% Formic | 2 | 0 | 0 | Cr13 | 0.4103 | 2 |

[1] gallons per thousand
[2] pounds per thousand
[3] corrosion rate

As shown in Table 3, the inhibitors made in accordance with the present invention (inhibitor numbers 1, 2, and 3) were much better than the prior art inhibitor (inhibitor number 4) in terms of corrosion rate and much better at pitting prevention of Cr13 steel in 1% HF/9% acetic acid.

TABLE 3

| Inhibitor | Deg Deg F. | PSIG | % HCl | % HF | Alternative Acid | gpt ACI | % Formic | ppt KI | Metal | $C_R^{[3]}$ Rate lbs./ft. sq. | Pitting |
|---|---|---|---|---|---|---|---|---|---|---|---|
| ACl 1 | 275 | 3000 | 0 | 1 | 1% HF:9% Formic | 8 | 0 | 0 | Cr13 | 0.0373 | 1 |
| ACl 1 | 275 | 3000 | 0 | 1 | 1% HF:9% Formic | 8 | 0 | 0 | Cr13 | 0.0386 | 1 |
| ACl 2 | 275 | 3000 | 0 | 1 | 1% HF:9% Formic | 8 | 0 | 0 | Cr13 | 0.0712 | 1 |
| ACl 2 | 275 | 3000 | 0 | 1 | 1% HF:9% Formic | 8 | 0 | 0 | Cr13 | 0.0636 | 1 |
| ACl 3 | 275 | 3000 | 0 | 1 | 1% HF:9% Formic | 8 | 0 | 0 | Cr13 | 0.0484 | 1 |
| ACl 3 | 275 | 3000 | 0 | 1 | 1% HF:9% Formic | 8 | 0 | 0 | Cr13 | 0.046 | 1 |
| ACl 4 | 275 | 3000 | 0 | 1 | 1% HF:9% Formic | 8 | 0 | 0 | Cr13 | 0.4748 | 5 |
| ACl 4 | 275 | 3000 | 0 | 1 | 1% HF:9% Formic | 8 | 0 | 0 | Cr13 | 0.4259 | 5 |

As shown in Table 4, the inhibitors made in accordance with the present invention (inhibitor numbers 1, 2, and 3) were better than the prior art inhibitor (inhibitor number 4) in terms of corrosion rate and in evidence of pitting for Cr13 steel in 1% HF/9% acetic acid.

TABLE 4

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 275 | 3000 | 0 | 1 | 1% HF:9% Formic | 5 | 0 | 10 | Cr13 | 0.0389 | 1 |
| ACl 1 | 275 | 3000 | 0 | 1 | 1% HF:9% Formic | 5 | 0 | 10 | Cr13 | 0.0343 | 1 |
| ACl 2 | 275 | 3000 | 0 | 1 | 1% HF:9% Formic | 5 | 0 | 10 | Cr13 | 0.0529 | 1 |
| ACl 2 | 275 | 3000 | 0 | 1 | 1% HF:9% Formic | 5 | 0 | 10 | Cr13 | 0.055 | 1 |
| ACl 3 | 275 | 3000 | 0 | 1 | 1% HF:9% Formic | 5 | 0 | 10 | Cr13 | 0.0517 | 2 |
| ACl 3 | 275 | 3000 | 0 | 1 | 1% HF:9% Formic | 5 | 0 | 10 | Cr13 | 0.0498 | 1 |
| ACl 4 | 275 | 3000 | 0 | 1 | 1% HF:9% Formic | 5 | 0 | 10 | Cr13 | 0.0688 | 3 |
| ACl 4 | 275 | 3000 | 0 | 1 | 1% HF:9% Formic | 5 | 0 | 10 | Cr13 | 0.0573 | 3 |

As shown in Table 5, the inhibitors made in accordance with the present invention (inhibitor numbers 1 and 3) offered much better protection to Cr13 steel in 10% acetic acid than the prior art inhibitor (inhibitor number 4) in terms of corrosion rate, with no pitting.

TABLE 5

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 250 | 3000 | 0 | 0 | 10% Acetic | 2 | 0 | 0 | Cr13 | 0.0012 | 0 |
| ACl 1 | 250 | 3000 | 0 | 0 | 10% Acetic | 2 | 0 | 0 | Cr13 | 0.0013 | 0 |
| ACl 3 | 250 | 3000 | 0 | 0 | 10% Acetic | 2 | 0 | 0 | Cr13 | 0.0013 | 0 |
| ACl 3 | 250 | 3000 | 0 | 0 | 10% Acetic | 2 | 0 | 0 | Cr13 | 0.001 | 0 |
| ACl 4 | 250 | 3000 | 0 | 0 | 10% Acetic | 2 | 0 | 0 | Cr13 | 0.0066 | 0 |
| ACl 4 | 250 | 3000 | 0 | 0 | 10% Acetic | 2 | 0 | 0 | Cr13 | 0.0106 | 0 |

As shown in Table 6, the inhibitors made in acordance with the present invention (inhibitor numbers 1, 2, and 3) were superior to the prior art inhibitor (inhibitor number 4) in terms of both corrosion rate and evidence of pitting for Cr 13 steel in 15% HCl acid at 250° F.

TABLE 6

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 275 | 3000 | 0 | 0 | 10% Acetic | 2 | 0 | 0 | Cr13 | 0.0012 | 0 |
| ACl 1 | 275 | 3000 | 0 | 0 | 10% Acetic | 2 | 0 | 0 | Cr13 | 0.0015 | 0 |
| ACl 2 | 275 | 3000 | 0 | 0 | 10% Acetic | 2 | 0 | 0 | Cr13 | 0.0011 | 0 |
| ACl 2 | 275 | 3000 | 0 | 0 | 10% Acetic | 2 | 0 | 0 | Cr13 | 0.001 | 0 |
| ACl 3 | 275 | 3000 | 0 | 0 | 10% Acetic | 2 | 0 | 0 | Cr13 | 0.0029 | 0 |
| ACl 3 | 275 | 3000 | 0 | 0 | 10% Acetic | 2 | 0 | 0 | Cr13 | 0.0027 | 0 |
| ACl 4 | 275 | 3000 | 0 | 0 | 10% Acetic | 2 | 0 | 0 | Cr13 | 0.0101 | 0 |
| ACl 4 | 275 | 3000 | 0 | 0 | 10% Acetic | 2 | 0 | 0 | Cr13 | 0.014 | 0 |

As shown in Table 7, the inhibitors made in accordance with the present invention (inhibitor numbers 1, 2, and 3) were much better than the prior art inhibitor (inhibitor number 4) in terms of both corrosion rate and evidence of pitting for Cr13 steel in 28% HCl acid. Improved ACI 3 did extremely well compared to the prior art ACI 4 in the 28% HCl acid.

TABLE 7

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 28 | 0 | 0 | 5 | 0 | 10 | Cr13 | 0.0427 | 2 |
| ACl 1 | 225 | 3000 | 28 | 0 | 0 | 5 | 0 | 10 | Cr13 | 0.0272 | 1 |
| ACl 2 | 225 | 3000 | 28 | 0 | 0 | 5 | 0 | 10 | Cr13 | 0.108 | 3 |
| ACl 2 | 225 | 3000 | 28 | 0 | 0 | 5 | 0 | 10 | Cr13 | 0.1508 | 1 |
| ACl 3 | 225 | 3000 | 28 | 0 | 0 | 5 | 0 | 10 | Cr13 | 0.0066 | 0 |
| ACl 3 | 225 | 3000 | 28 | 0 | 0 | 5 | 0 | 10 | Cr13 | 0.0065 | 1 |
| ACl 4 | 225 | 3000 | 28 | 0 | 0 | 5 | 0 | 10 | Cr13 | 0.3449 | 3 |
| ACl 4 | 225 | 3000 | 28 | 0 | 0 | 5 | 0 | 10 | Cr13 | 0.3638 | 3 |

As shown in Table 8, the inhibitors made in accordance with the present invention (inhibitor numbers 1, 2, and 3) were better than the prior art inhibitor (inhibitor number 4) in terms of corrosion rate for Cr13 steel in 15% HCl acid while pitting was comparable.

TABLE 8

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 28 | 0 | 0 | 5 | 0 | 10 | Cr13 | 0.0427 | 2 |
| ACl 1 | 225 | 3000 | 28 | 0 | 0 | 5 | 0 | 10 | Cr13 | 0.0272 | 1 |
| ACl 2 | 225 | 3000 | 28 | 0 | 0 | 5 | 0 | 10 | Cr13 | 0.108 | 3 |
| ACl 2 | 225 | 3000 | 28 | 0 | 0 | 5 | 0 | 10 | Cr13 | 0.1508 | 1 |
| ACl 3 | 225 | 3000 | 28 | 0 | 0 | 5 | 0 | 10 | Cr13 | 0.0066 | 0 |
| ACl 3 | 225 | 3000 | 28 | 0 | 0 | 5 | 0 | 10 | Cr13 | 0.0065 | 1 |
| ACl 4 | 225 | 3000 | 28 | 0 | 0 | 5 | 0 | 10 | Cr13 | 0.3449 | 3 |
| ACl 4 | 225 | 3000 | 28 | 0 | 0 | 5 | 0 | 10 | Cr13 | 0.3638 | 3 |

As shown in Table 9, the inhibitors made in accordance with the present invention (inhibitor numbers 1 and 3) were comparable to the prior art inhibitor (inhibitor number 4) in terms of both corrosion rate and evidence of pitting for Cr13 steel in 10% acetic acid.

TABLE 9

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 250 | 3000 | 15 | 0 | 0 | 5 | 0.04 | 0 | Cr13 | 0.0135 | 1 |
| ACl 1 | 250 | 3000 | 15 | 0 | 0 | 5 | 0.04 | 0 | Cr13 | 0.018 | 1 |
| ACl 3 | 250 | 3000 | 15 | 0 | 0 | 5 | 0.04 | 0 | Cr13 | 0.0087 | 0 |
| ACl 3 | 250 | 3000 | 15 | 0 | 0 | 5 | 0.04 | 0 | Cr13 | 0.0083 | 0 |
| ACl 4 | 250 | 3000 | 15 | 0 | 0 | 5 | 0.04 | 0 | Cr13 | 0.0135 | 0 |
| ACl 4 | 250 | 3000 | 15 | 0 | 0 | 5 | 0.04 | 0 | Cr13 | 0.0263 | 0 |

As shown in Table 10, the inhibitors made in accordance with the present invention (inhibitor numbers 1, 2, and 3) were comparable to the prior art inhibitor (inhibitor number 4) in terms of both corrosion rate and evidence of pitting for Cr13 steel in 6% HCl/1.5% HF acid.

TABLE 10

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 6 | 1.5 | 0 | 8 | 0 | 0 | Cr13 | 0.0117 | 0 |
| ACl 1 | 225 | 3000 | 6 | 1.5 | 0 | 8 | 0 | 0 | Cr13 | 0.0115 | 0 |
| ACl 2 | 225 | 3000 | 6 | 1.5 | 0 | 8 | 0 | 0 | Cr13 | 0.0084 | 0 |
| ACl 2 | 225 | 3000 | 6 | 1.5 | 0 | 8 | 0 | 0 | Cr13 | 0.0084 | 0 |
| ACl 3 | 225 | 3000 | 6 | 1.5 | 0 | 8 | 0 | 0 | Cr13 | 0.0095 | 0 |
| ACl 3 | 225 | 3000 | 6 | 1.5 | 0 | 8 | 0 | 0 | Cr13 | 0.0094 | 0 |
| ACl 4 | 225 | 3000 | 6 | 1.5 | 0 | 8 | 0 | 0 | Cr13 | 0.0116 | 0 |
| ACl 4 | 225 | 3000 | 6 | 1.5 | 0 | 8 | 0 | 0 | Cr13 | 0.0136 | 0 |

As shown in Table 11, the inhibitors made in accordance with the present invention (inhibitor numbers 1, 2, and 3) were comparable to the prior art inhibitor (inhibitor number 4) in terms of both corrosion rate and evidence of pitting for Cr13 in 12% HCl/3% HF acid.

TABLE 11

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 12 | 3 | 0 | 8 | 0 | 10 | Cr13 | 0.0093 | 0 |
| ACl 1 | 225 | 3000 | 12 | 3 | 0 | 8 | 0 | 10 | Cr13 | 0.0097 | 0 |
| ACl 2 | 225 | 3000 | 12 | 3 | 0 | 8 | 0 | 10 | Cr13 | 0.0082 | 0 |
| ACl 2 | 225 | 3000 | 12 | 3 | 0 | 8 | 0 | 10 | Cr13 | 0.0077 | 0 |
| ACl 3 | 225 | 3000 | 12 | 3 | 0 | 8 | 0 | 10 | Cr13 | 0.0084 | 0 |
| ACl 3 | 225 | 3000 | 12 | 3 | 0 | 8 | 0 | 10 | Cr13 | 0.0087 | 0 |
| ACl 4 | 225 | 3000 | 12 | 3 | 0 | 8 | 0 | 10 | Cr13 | 0.0134 | 0 |
| ACl 4 | 225 | 3000 | 12 | 3 | 0 | 8 | 0 | 10 | Cr13 | 0.0073 | 0 |

As shown in Table 12, the inhibitors made in accordance with the present invention (inhibitor numbers 1, 2, and 3) were much better than the prior art inhibitor (inhibitor number 4) in terms of corrosion rate and much better in evidence of pitting for Cr2205 steel in 1% HF/9% formic acid.

TABLE 12

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 275 | 3000 | 0 | 1 | 1% HF:9% Formic | 30 | 0 | 2 | Cr2205 | 0.0068 | 0 |
| ACl 1 | 275 | 3000 | 0 | 1 | 1% HF:9% Formic | 30 | 0 | 2 | Cr2205 | 0.0068 | 0 |
| ACl 2 | 275 | 3000 | 0 | 1 | 1% HF:9% Formic | 30 | 0 | 2 | Cr2205 | 0.0071 | 0 |
| ACl 2 | 275 | 3000 | 0 | 1 | 1% HF:9% Formic | 30 | 0 | 2 | Cr2205 | 0.0068 | 0 |
| ACl 3 | 275 | 3000 | 0 | 1 | 1% HF:9% Formic | 30 | 0 | 2 | Cr2205 | 0.0835 | 1 |
| ACl 3 | 275 | 3000 | 0 | 1 | 1% HF:9% Formic | 30 | 0 | 2 | Cr2205 | 0.0912 | 1 |
| ACl 4 | 275 | 3000 | 0 | 1 | 1% HF:9% Formic | 30 | 0 | 2 | Cr2205 | 0.2518 | 4 |
| ACl 4 | 275 | 3000 | 0 | 1 | 1% HF:9% Formic | 30 | 0 | 2 | Cr2205 | 0.2608 | 4 |

As shown in Table 13, the inhibitors made in accordance with the present invention (inhibitor numbers 1, 2, and 3) were superior than the prior art inhibitor (inhibitor number 4) in terms of both corrosion rate and pitting prevention for Cr13 steel in 1% HF/9% formic acid.

TABLE 13

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 6 | 1.5 | 0 | 8 | 0 | 10 | Cr2205 | 0.0572 | 0 |
| ACl 1 | 225 | 3000 | 6 | 1.5 | 0 | 8 | 0 | 10 | Cr2205 | 0.0555 | 0 |
| ACl 2 | 225 | 3000 | 6 | 1.5 | 0 | 8 | 0 | 10 | Cr2205 | 0.0292 | 0 |
| ACl 2 | 225 | 3000 | 6 | 1.5 | 0 | 8 | 0 | 10 | Cr2205 | 0.0275 | 0 |
| ACl 3 | 225 | 3900 | 6 | 1.5 | 0 | 8 | 0 | 10 | Cr2205 | 0.1045 | 1 |
| ACl 3 | 225 | 3000 | 6 | 1.5 | 0 | 8 | 0 | 10 | Cr2205 | 0.0913 | 1 |
| ACl 4 | 225 | 3000 | 6 | 1.5 | 0 | 8 | 0 | 10 | Cr2205 | 0.1793 | 2 |
| ACl 4 | 225 | 3000 | 6 | 1.5 | 0 | 8 | 0 | 10 | Cr2205 | 0.1717 | 2 |

As shown in Table 14, the inhibitors made in accordance with the present invention (inhibitor numbers 1, 2, and 3) were better than the prior art inhibitor (inhibitor number 4) in terms of corrosion rate and equal in evidence of pitting for Cr2205 duplex steel in 12% HCl/3% HF acid.

TABLE 14

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 12 | 3 | 0 | 8 | 0 | 10 | Cr2205 | 0.0544 | 0 |
| ACl 2 | 225 | 3000 | 12 | 3 | 0 | 8 | 0 | 10 | Cr2205 | 0.0526 | 0 |
| ACl 3 | 225 | 3000 | 12 | 3 | 0 | 8 | 0 | 10 | Cr2205 | 0.043 | 0 |
| ACl 4 | 225 | 3000 | 12 | 3 | 0 | 8 | 0 | 10 | Cr2205 | 0.0758 | 0 |

As shown in Table 15, the inhibitors made in accordance with the present invention (inhibitor numbers 1, 2, and 3) were better than the prior art inhibitor (inhibitor number 4) in terms of corrosion rate and comparable in evidence of pitting for Cr2205 steel in 15% HCl acid.

TABLE 15

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 15 | 0 | 0 | 8 | 0 | 10 | Cr2205 | 0.0281 | 0 |
| ACl 1 | 225 | 3000 | 15 | 0 | 0 | 8 | 0 | 10 | Cr2205 | 0.0226 | 0 |
| ACl 2 | 225 | 3000 | 15 | 0 | 0 | 8 | 0 | 10 | Cr2205 | 0.0106 | 0 |
| ACl 2 | 225 | 3000 | 15 | 0 | 0 | 8 | 0 | 10 | Cr2205 | 0.0101 | 0 |
| ACl 3 | 225 | 3000 | 15 | 0 | 0 | 8 | 0 | 10 | Cr2205 | 0.0177 | 0 |
| ACl 3 | 225 | 3000 | 15 | 0 | 0 | 8 | 0 | 10 | Cr2205 | 0.021 | 0 |
| ACl 4 | 225 | 3000 | 15 | 0 | 0 | 8 | 0 | 10 | Cr2205 | 0.0426 | 0 |
| ACl 4 | 225 | 3000 | 15 | 0 | 0 | 8 | 0 | 10 | Cr2205 | 0.0408 | 0 |

As shown in Table 16, the inhibitors made in accordance with the present invention (inhibitor numbers 1, 2, and 3) were better than the prior art inhibitor (inhibitor number 4) in terms of both corrosion rate and comparable in evidence of pitting.

TABLE 16

| Inhibitor | Deg F. | PSIG | % HCl | % HF | Alternative Acid | gpt ACI | % Formic | ppt KI | Metal | $C_{R\ RATE}$ lbs./ft. sq. | Pitting |
|---|---|---|---|---|---|---|---|---|---|---|---|
| ACl 1 | 225 | 3000 | 28 | 0 | 0 | 10 | 0 | 2 | Cr2205 | 0.0482 | 2 |
| ACl 2 | 225 | 3000 | 28 | 0 | 0 | 10 | 0 | 2 | Cr2205 | 0.0361 | 2 |
| ACl 3 | 225 | 3000 | 28 | 0 | 0 | 10 | 0 | 2 | Cr2205 | 0.0314 | 1 |
| ACl 3 | 225 | 3000 | 28 | 0 | 0 | 10 | 0 | 2 | Cr2205 | 0.0278 | 1 |
| ACl 4 | 225 | 3000 | 28 | 0 | 0 | 10 | 0 | 2 | Cr2205 | 0.0907 | 2 |

As shown in Table 17, the inhibitors made in accordance with the present invention (inhibitor numbers 1, 2, and 3) were better than the prior art inhibitor (inhibitor number 4) in terms of corrosion rate and worse in evidence of pitting for Cr2205 steel in 1% HF/9% acetic acid.

TABLE 17

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Acetic | 20 | 0 | 2 | Cr2205 | 0.0687 | 1 |
| ACl 2 | 275 | 3000 | 0 | 1 | 1% HF:9% Acetic | 20 | 0 | 2 | Cr2205 | 0.0757 | 1 |

TABLE 17-continued

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 3 | 275 | 3000 | 0 | 1 | 1% HF:9% Acetic | 20 | 0 | 2 | Cr2205 | 0.077 | 1 |
| ACl 3 | 275 | 3000 | 0 | 1 | 1% HF:9% Acetic | 20 | 0 | 2 | Cr2205 | 0.786 | 1 |
| ACl 4 | 275 | 3000 | 0 | 1 | 1% HF:9% Acetic | 20 | 0 | 2 | Cr2205 | 0.1353 | 0 |

As shown in Table 18, the inhibitors made in accordance with the present invention (inhibitor numbers 1, 2, and 3) were comparable to the prior art inhibitor (inhibitor number 4) in terms of both corrosion rate and evidence of pitting for Cr2205 duplex steel in 1% HF/9% acetic acid.

TABLE 18

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Acetic | 30 | 0 | 10 | Cr2205 | 0.007 | 0 |
| ACl 3 | 275 | 3000 | 0 | 1 | 1% HF:9% Acetic | 30 | 0 | 10 | Cr2205 | 0.0853 | 1 |
| ACl 3 | 275 | 3000 | 0 | 1 | 1% HF:9% Acetic | 30 | 0 | 10 | Cr2205 | 0.0809 | 1 |
| ACl 4 | 275 | 3000 | 0 | 1 | 1% HF:9% Acetic | 30 | 0 | 10 | Cr2205 | 0.0076 | 0 |

As shown in Table 19, the inhibitors made in accordance with the present invention (inhibitor numbers 1, 2, and 3) were slightly worse than the prior art inhibitor (inhibitor number 4) in terms of both corrosion rate and evidence of pitting for Cr2205 steel in 10% formic acid.

TABLE 19

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Formic | 1 | 0 | 0 | Cr2205 | 0.0116 | 0 |
| ACl 1 | 275 | 3000 | 0 | 0 | 10% Formic | 1 | 0 | 0 | Cr2205 | 0.0094 | 0 |
| ACl 2 | 275 | 3000 | 0 | 0 | 10% Formic | 1 | 0 | 0 | Cr2205 | 0.0122 | 0 |
| ACl 2 | 275 | 3000 | 0 | 0 | 10% Formic | 1 | 0 | 0 | Cr2205 | 0.0101 | 0 |
| ACl 3 | 275 | 3000 | 0 | 0 | 10% Formic | 1 | 0 | 0 | Cr2205 | 0.0116 | 0 |
| ACl 3 | 275 | 3000 | 0 | 0 | 10% Formic | 1 | 0 | 0 | Cr2205 | 0.0111 | 0 |
| ACl 4 | 275 | 3000 | 0 | 0 | 10% Formic | 1 | 0 | 0 | Cr2205 | 0.0062 | 0 |
| ACl 4 | 275 | 3000 | 0 | 0 | 10% Formic | 1 | 0 | 0 | Cr2205 | 0.0058 | 0 |

As shown in Table 20 the inhibitors made in accordance with the present invention (inhibitor numbers 1, 2, and 3) were astoundingly better than the prior art inhibitor (inhibitor number 4) in terms of both corrosion rate and evidence of pitting for N80 steel in 10% formic acid.

TABLE 20

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Formic | 2 | 0 | 0 | N80 | 0.0048 | 0 |
| ACl 1 | 275 | 3000 | 0 | 0 | 10% Formic | 2 | 0 | 0 | N80 | 0.0033 | 0 |
| ACl 2 | 275 | 3000 | 0 | 0 | 10% Formic | 2 | 0 | 0 | N80 | 0.003 | 0 |
| ACl 2 | 275 | 3000 | 0 | 0 | 10% Formic | 2 | 0 | 0 | N80 | 0.0037 | 0 |
| ACl 3 | 275 | 3000 | 0 | 0 | 10% Formic | 2 | 0 | 0 | N80 | 0.0116 | 1 |
| ACl 3 | 275 | 3000 | 0 | 0 | 10% Formic | 2 | 0 | 0 | N80 | 0.0148 | 2 |

TABLE 20-continued

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 4 | 275 | 3000 | 0 | 0 | 10% Formic | 2 | 0 | 0 | N80 | 0.4889 | 3 |
| ACl 4 | 275 | 3000 | 0 | 0 | 10% Formic | 2 | 0 | 0 | N80 | 0.4807 | 3 |

As shown in Table 21 the inhibitors made in accordance with the present invention (inhibitor numbers 1, 2, and 3) were better than the prior art inhibitor (inhibitor number 4) in terms of both corrosion rate and the same in pitting for N80 steel at 275° F. in 10% acetic acid.

TABLE 21

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Acetic | 2 | 0 | 0 | N80 | 0.0011 | 0 |
| ACl 1 | 275 | 3000 | 0 | 0 | 10% Acetic | 2 | 0 | 0 | N80 | 0.0012 | 0 |
| ACl 2 | 275 | 3000 | 0 | 0 | 10% Acetic | 2 | 0 | 0 | N80 | 0.0014 | 0 |
| ACl 2 | 275 | 3000 | 0 | 0 | 10% Acetic | 2 | 0 | 0 | N80 | 0.0014 | 0 |
| ACl 3 | 275 | 3000 | 0 | 0 | 10% Acetic | 2 | 0 | 0 | N80 | 0.0016 | 0 |
| ACl 3 | 275 | 3000 | 0 | 0 | 10% Acetic | 2 | 0 | 0 | N80 | 0.0018 | 0 |
| ACl 4 | 275 | 3000 | 0 | 0 | 10% Acetic | 2 | 0 | 0 | N80 | 0.0082 | 0 |
| ACl 4 | 275 | 3000 | 0 | 0 | 10% Acetic | 2 | 0 | 0 | N80 | 0.0082 | 0 |

As shown in Table 22 the inhibitors made in accordance with the present invention (inhibitor numbers 1, 2, and 3) were the same as the prior art inhibitor (inhibitor number 4) in terms of both corrosion rate and evidence of pitting for N80 steel in 10% acetic acid at 250° F.

TABLE 22

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Acetic | 2 | 0 | 0 | N80 | 0.001 | 0 |
| ACl 1 | 250 | 3000 | 0 | 0 | 10% Acetic | 2 | 0 | 0 | N80 | 0.0015 | 0 |
| ACl 3 | 250 | 3000 | 0 | 0 | 10% Acetic | 2 | 0 | 0 | N80 | 0.0012 | 0 |
| ACl 3 | 250 | 3000 | 0 | 0 | 10% Acetic | 2 | 0 | 0 | N80 | 0.0013 | 0 |
| ACl 4 | 250 | 3000 | 0 | 0 | 10% Acetic | 2 | 0 | 0 | N80 | 0.0097 | 0 |
| ACl 4 | 250 | 3000 | 0 | 0 | 10% Acctic | 2 | 0 | 0 | N80 | 0.009 | 0 |

As shown in Table 23, the inhibitors made in accordance with the present invention (inhibitor numbers 1 and 3) were much better than the prior art inhibitor (inhibitor number 4) in terms of corrosion rate and similar in pitting for N80 steel in 15% HCl.

TABLE 23

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 250 | 3000 | 15 | | 0 | 6 | 0 | 0 | N80 | 0.0343 | 1 |
| ACl 3 | 250 | 3000 | 15 | | 0 | 6 | 0 | 0 | N80 | 0.0154 | 0 |
| ACl 3 | 250 | 3000 | 15 | | 0 | 6 | 0 | 0 | N80 | 0.0166 | 0 |
| ACl 4 | 250 | 3000 | 15 | | 0 | 6 | 0 | 0 | N80 | 0.1104 | 1 |

As shown in Table 24 the inhibitors made in accordance with the present invention (inhibitor numbers 1, 2, and 3) were the same as the prior art inhibitor (inhibitor number 4) in terms of both corrosion rate and evidence of pitting for N80 steel in 28% HCl acid.

TABLE 24

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 225 | 3000 | 28 | 0 | 0 | 8 | 0 | 0 | N80 | 0.0088 | 0 |
| ACl 1 | 225 | 3000 | 28 | 0 | 0 | 8 | 0 | 0 | N80 | 0.0101 | 0 |
| ACl 2 | 225 | 3000 | 28 | 0 | 0 | 8 | 0 | 0 | N80 | 0.0099 | 0 |
| ACl 2 | 225 | 3000 | 28 | 0 | 0 | 8 | 0 | 0 | N80 | 0.0106 | 1 |
| ACl 3 | 225 | 3000 | 28 | 0 | 0 | 8 | 0 | 0 | N80 | 0.0095 | 0 |
| ACl 3 | 225 | 3000 | 28 | 0 | 0 | 8 | 0 | 0 | N80 | 0.0093 | 0 |
| ACl 4 | 225 | 3000 | 28 | 0 | 0 | 8 | 0 | 0 | N80 | 0.0094 | 0 |
| ACl 4 | 225 | 3000 | 28 | 0 | 0 | 8 | 0 | 0 | N80 | 0.0103 | 1 |

As shown in Table 25, the inhibitors made in accordance with the present invention (inhibitor numbers 1, 2, and 3) were comparable to the prior art inhibitor (inhibitor number 4) in terms of both corrosion rate and evidence of pitting for N80 steel in 6% HCl/1.5% HF.

TABLE 25

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 225 | 3000 | 6 | 1.5 | 0 | 8 | 0 | 0 | N80 | 0.01 | 0 |
| ACl 1 | 225 | 3000 | 6 | 1.5 | 0 | 8 | 0 | 0 | N80 | 0.0096 | 0 |
| ACl 1 | 225 | 3000 | 6 | 1.5 | 0 | 8 | 0 | 0 | N80 | 0.008 | 0 |
| ACl 2 | 225 | 3000 | 6 | 1.5 | 0 | 8 | 0 | 0 | N80 | 0.0073 | 0 |
| ACl 2 | 225 | 3000 | 6 | 1.5 | 0 | 8 | 0 | 0 | N80 | 0.0069 | 0 |
| ACl 3 | 225 | 3000 | 6 | 1.5 | 0 | 8 | 0 | 0 | N80 | 0.0062 | 0 |
| ACl 3 | 225 | 3000 | 6 | 1.5 | 0 | 8 | 0 | 0 | N80 | 0.0076 | 0 |
| ACl 4 | 225 | 3000 | 6 | 1.5 | 0 | 8 | 0 | 0 | N80 | 0.0082 | 0 |

As shown in Table 26 the inhibitors made in accordance with the present invention (inhibitor numbers 1, 2, and 3) were comparable to the prior art inhibitor (inhibitor number 4) in terms of both corrosion rate and evidence of pitting for N80 steel in 12% HCl/3% HF.

TABLE 26

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 225 | 3000 | 12 | 3 | 0 | 8 | 0 | 0 | N80 | 0.0113 | 0 |
| ACl 1 | 225 | 3000 | 12 | 3 | 0 | 8 | 0 | 0 | N80 | 0.0096 | 0 |
| ACl 2 | 225 | 3000 | 12 | 3 | 0 | 8 | 0 | 0 | N80 | 0.0075 | 0 |
| ACl 2 | 225 | 3000 | 12 | 3 | 0 | 8 | 0 | 0 | N80 | 0.009 | 0 |
| ACl 3 | 225 | 300Q | 12 | 3 | 0 | 8 | 0 | 0 | N80 | 0.0087 | 0 |
| ACl 3 | 225 | 3000 | 12 | 3 | 0 | 8 | 0 | 0 | N80 | 0.0077 | 0 |
| ACl 4 | 225 | 3000 | 12 | 3 | 0 | 8 | 0 | 0 | N80 | 0.0105 | 0 |
| ACl 4 | 225 | 3000 | 12 | 3 | 0 | 8 | 0 | 0 | N80 | 0.0102 | 0 |

As shown in Table 27, the inhibitors made in accordance with the present invention (inhibitor numbers 1, 2, and 3) were similar to the prior art inhibitor (inhibitor number 4) in terms of both corrosion rate and evidence of pitting for N80 steel in 1% HF/9% acetic acid.

TABLE 27

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Acetic | 5 | 0 | 10 | N80 | 0.0067 | 0 |
| ACl 1 | 275 | 3000 | 0 | 1 | 1% HF:9% Acetic | 5 | 0 | 10 | N80 | 0.0082 | 0 |

TABLE 27-continued

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 2 | 275 | 3000 | 0 | 1 | 1% HF:9% Acetic | 5 | 0 | 10 | N80 | 0.0102 | 0 |
| ACl 2 | 275 | 3000 | 0 | 1 | 1% HF:9% Acetic | 5 | 0 | 10 | N80 | 0.0125 | 0 |
| ACl 3 | 275 | 3000 | 0 | 1 | 1% HF:9% Acetic | 5 | 0 | 10 | N80 | 0.0105 | 0 |
| ACl 3 | 275 | 3000 | 0 | 1 | 1% HF:9% Acetic | 5 | 0 | 10 | N80 | 0.0116 | 0 |
| ACl 4 | 275 | 3000 | 0 | 1 | 1% HF:9% Acetic | 5 | 0 | 10 | N80 | 0.0062 | 0 |
| ACl 4 | 275 | 3000 | 0 | 1 | 1% HF:9% Acetic | 5 | 0 | 10 | N80 | 0.0075 | 0 |

As shown in Table 28, the inhibitors made in accordance with the present invention (inhibitor numbers 1, 2, and 3) were better than the prior art inhibitor (inhibitor number 4) in terms of corrosion rate and similar in pitting for N80 steel in 1% HF/9% acetic acid.

As shown in Table 29, the inhibitors made in accordance with the present invention (inhibitor numbers 1, 2, and 3) were better than the prior art inhibitor (inhibitor number 4) in terms of both corrosion rate and had similar amounts of pitting for N80 steel in 1% HF/9% formic acid.

TABLE 28

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Acetic | 8 | 0 | 0 | N80 | 0.0058 | 0 |
| ACl 1 | 275 | 3000 | 0 | 1 | 1% HF:9% Acetic | 8 | 0 | 0 | N80 | 0.0066 | 0 |
| ACl 2 | 275 | 3000 | 0 | 1 | 1% HF:9% Acetic | 8 | 0 | 0 | N80 | 0.0074 | 0 |
| ACl 2 | 275 | 3000 | 0 | 1 | 1% HF:9% Acetic | 8 | 0 | 0 | N80 | 0.0068 | 0 |
| ACl 3 | 275 | 3000 | 0 | 1 | 1% HF:9% Acetic | 8 | 0 | 0 | N80 | 0.0059 | 0 |
| ACl 3 | 275 | 3000 | 0 | 1 | 1% HF:9% Acetic | 8 | 0 | 0 | N80 | 0.0058 | 0 |
| ACl 4 | 275 | 3000 | 0 | 1 | 1% HF:9% Acetic | 8 | 0 | 0 | N80 | 0.0102 | 0 |
| ACl 4 | 275 | 3000 | 0 | 1 | 1% HF:9% Acetic | 8 | 0 | 0 | N80 | 0.0084 | 0 |

TABLE 29

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Formic | 5 | 0 | 0 | N80 | 0.0131 | 1 |
| ACl 1 | 275 | 3000 | 0 | 1 | 1% HF:9% Formic | 5 | 0 | 0 | N80 | 0.0141 | 1 |
| ACl 2 | 275 | 3000 | 0 | 1 | 1% HF:9% Formic | 5 | 0 | 0 | N80 | 0.0197 | 1 |
| ACl 2 | 275 | 3000 | 0 | 1 | 1% HF:9% Formic | 5 | 0 | 0 | N80 | 0.0202 | 0 |
| ACT 3 | 275 | 3000 | 0 | 1 | 1% HF:9% Formic | 5 | 0 | 0 | N80 | 0.0284 | 3 |
| ACl 3 | 275 | 3000 | 0 | 1 | 1% HF:9% Formic | 5 | 0 | 0 | N80 | 0.0206 | 2 |
| ACl 4 | 275 | 3000 | 0 | 1 | 1% HF:9% Formic | 5 | 0 | 0 | N80 | 0.0345 | 1 |
| ACl 4 | 275 | 3000 | 0 | 1 | 1% HF:9% Formic | 5 | 0 | 0 | N80 | 0.0318 | 1 |

As shown in Table 30, the inhibitors made in accordance with the present invention (inhibitor numbers 1, 2, and 3) were astoundingly better than the prior art inhibitor (inhibitor number 4) in terms of both corrosion rate and evidence of pitting for Quality coiled tubing in 10% formic acid.

TABLE 30

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Formic | 2 | 0 | 0 | QCT | 0.0132 | 0 |
| ACl 1 | 275 | 3000 | 0 | 0 | 10% Formic | 2 | 0 | 0 | QCT | 0.0123 | 0 |
| ACl 2 | 275 | 3000 | 0 | 0 | 10% Formic | 2 | 0 | 0 | QCT | 0.0045 | 0 |
| ACl 2 | 275 | 3000 | 0 | 0 | 10% Formic | 2 | 0 | 0 | QCT | 0.0069 | 0 |
| ACl 3 | 275 | 3000 | 0 | 0 | 10% Formic | 2 | 0 | 0 | QCT | 0.0037 | 0 |
| ACl 3 | 275 | 3000 | 0 | 0 | 10% Formic | 2 | 0 | 0 | QCT | 0.0038 | 0 |
| ACl 4 | 275 | 3000 | 0 | 0 | 10% Formic | 2 | 0 | 0 | QCT | 0.5114 | 3 |
| ACl 4 | 275 | 3000 | 0 | 0 | 10% Formic | 2 | 0 | 0 | QCT | 0.5115 | 3 |

As shown in Table 31 the inhibitors made in accordance with the present invention (inhibitor numbers 1, 2, and 3) were much better than the prior art inhibitor (inhibitor number 4) in terms of both corrosion rate and were similar in pitting for Quality coiled tubing in 10% acetic acid.

TABLE 31

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 0 | 10% Acetic | 2 | 0 | 0 | QCT | 0.0004 | 0 |
| ACl 1 | 275 | 3000 | 0 | 0 | 10% Acetic | 2 | 0 | 0 | QCT | 0.0006 | 0 |
| ACl 2 | 275 | 3000 | 0 | 0 | 10% Acetic | 2 | 0 | 0 | QCT | 0.0005 | 0 |
| ACl 2 | 275 | 3000 | 0 | 0 | 10% Acetic | 2 | 0 | 0 | QCT | 0.0006 | 0 |
| ACl 3 | 275 | 3000 | 0 | 0 | 10% Acetic | 2 | 0 | 0 | QCT | 0.001 | 0 |
| ACl 3 | 275 | 3000 | 0 | 0 | 10% Acetic | 2 | 0 | 0 | QCT | 0.0007 | 0 |
| ACl 4 | 275 | 3000 | 0 | 0 | 10% Acetic | 2 | 0 | 0 | QCT | 0.0088 | 0 |
| ACl 4 | 275 | 3000 | 0 | 0 | 10% Acetic | 2 | 0 | 0 | QCT | 0.0056 | 0 |

As shown in Table 32, the inhibitors made in accordance with the present invention (inhibitor numbers 1, 2, and 3) were comparable to the prior art inhibitor (inhibitor number 4) in terms of both corrosion rate and evidence of pitting for Quality coiled tubing in 1% HF/9% acetic acid.

TABLE 32

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 275 | 3000 | 0 | 1 | 1% HF:9% Acetic | 5 | 0 | 0 | QCT | 0.0053 | 0 |
| ACl 1 | 275 | 3000 | 0 | 1 | 1% HF:9% Acetic | 5 | 0 | 0 | QCT | 0.0035 | 0 |
| ACl 2 | 275 | 3000 | 0 | 1 | 1% HF:9% Acetic | 5 | 0 | 0 | QCT | 0.009 | 0 |
| ACl 2 | 275 | 3000 | 0 | 1 | 1% HF:9% Acetic | 5 | 0 | 0 | QCT | 0.0053 | 0 |
| ACl 3 | 275 | 3000 | 0 | 1 | 1% HF:9% Acetic | 5 | 0 | 0 | QCT | 0.0095 | 0 |
| ACl 3 | 275 | 3000 | 0 | 1 | 1% HF:9% Acetic | 5 | 0 | 0 | QCT | 0.0084 | 0 |
| ACl 4 | 275 | 3000 | 0 | 1 | 1% HF:9% Acetic | 5 | 0 | 0 | QCT | 0.009 | 0 |
| ACl 4 | 275 | 3000 | 0 | 1 | 1% HF:9% Acetic | 5 | 0 | 0 | QCT | 0.007 | 0 |

As shown in Table 33, the inhibitors made in accordance with the present invention (inhibitor numbers 1, 2, and 3) were similar to the prior art inhibitor (inhibitor number 4) in terms of both corrosion rate and evidence of pitting for Quality coiled tubing in 1% HF/9% formic acid.

TABLE 33

| Inhibitor | Deg F. | PSIG | % HCl | % HF | Alternative Acid | gpt ACI | % Formic | ppt KI | Metal | $C_{R\,Rate}$ lbs./ft. sq. | Pitting |
|---|---|---|---|---|---|---|---|---|---|---|---|
| ACl 1 | 275 | 3000 | 0 | 1 | 1% HF:9% Formic | 5 | 0 | 0 | QCT | 0.0081 | 0 |
| ACl 1 | 275 | 3000 | 0 | 1 | 1% HF:9% Formic | 5 | 0 | 0 | QCT | 0.009 | 1 |
| ACl 2 | 275 | 3000 | 0 | 1 | 1% HF:9% Formic | 5 | 0 | 0 | QCT | 0.0113 | 0 |
| ACl 2 | 275 | 3000 | 0 | 1 | 1% HF:9% Formic | 5 | 0 | 0 | QCT | 0.015 | 1 |
| ACl 3 | 275 | 3000 | 0 | 1 | 1% HF:9% Formic | 5 | 0 | 0 | QCT | 0.0126 | 0 |
| ACl 3 | 275 | 3000 | 0 | 1 | 1% HF:9% Formic | 5 | 0 | 0 | QCT | 0.015 | 0 |
| ACl 4 | 275 | 3000 | 0 | 1 | 1% HF:9% Formic | 5 | 0 | 0 | QCT | 0.0117 | 0 |
| ACl 4 | 275 | 3000 | 0 | 1 | 1% HF:9% Formic | 5 | 0 | 0 | QCT | 0.0143 | 1 |

As shown in Table 34, the inhibitors made in accordance with the present invention (inhibitor numbers 1, 2, and 3) were similar to the prior art inhibitor (inhibitor number 4) in terms of both corrosion rate and evidence of pitting for Quality coiled tubing in 28% HCl.

TABLE 34

| Inhibitor | Deg F. | PSIG | % HCl | % HF | Alternative Acid | gpt ACI | % Formic | ppt KI | Metal | $C_{R\,Rate}$ lbs./ft. sq. | Pitting |
|---|---|---|---|---|---|---|---|---|---|---|---|
| ACl 1 | 225 | 3000 | 28 | 0 | 0 | 4 | 0 | 0 | QCT | 0.0092 | 0 |
| ACl 1 | 225 | 3000 | 28 | 0 | 0 | 4 | 0 | 0 | QCT | 0.0088 | 0 |
| ACl 2 | 225 | 3000 | 28 | 0 | 0 | 4 | 0 | 0 | QCT | 0.0087 | 1 |
| ACl 2 | 225 | 3000 | 28 | 0 | 0 | 4 | 0 | 0 | QCT | 0.0092 | 1 |
| ACl 3 | 225 | 3000 | 28 | 0 | 0 | 4 | 0 | 0 | QCT | 0.0086 | 0 |
| ACl 3 | 225 | 3000 | 28 | 0 | 0 | 4 | 0 | 0 | QCT | 0.0103 | 0 |
| ACl 4 | 225 | 3000 | 28 | 0 | 0 | 4 | 0 | 0 | QCT | 0.0105 | 1 |
| ACl 4 | 225 | 3000 | 28 | 0 | 0 | 4 | 0 | 0 | QCT | 0.0099 | 1 |

As shown in Table 35 the inhibitors made in accordance with the present invention (inhibitor numbers 1, 2, and 3) were slightly worse than the prior art inhibitor (inhibitor number 4) in terms of both corrosion rate and evidence of pitting for Quality coiled tubing in 15% HCl.

TABLE 35

| Inhibitor | Deg F. | PSIG | % HCl | % HF | Alternative Acid | gpt ACI | % Formic | ppt KI | Metal | $C_{R\,Rate}$ lbs./ft. sq. | Pitting |
|---|---|---|---|---|---|---|---|---|---|---|---|
| ACl 1 | 225 | 3000 | 15 | 0 | 0 | 5 | 0 | 0 | QCT | 0.0139 | 1 |
| ACl 1 | 225 | 3000 | 15 | 0 | 0 | 5 | 0 | 0 | QCT | 0.0124 | 1 |
| ACl 2 | 225 | 3000 | 15 | 0 | 0 | 5 | 0 | 0 | QCT | 0.0074 | 0 |
| ACl 2 | 225 | 3000 | 15 | 0 | 0 | 5 | 0 | 0 | QCT | 0.0083 | 0 |
| ACl 3 | 225 | 3000 | 15 | 0 | 0 | 5 | 0 | 0 | QCT | 0.0143 | 1 |
| ACl 3 | 225 | 3000 | 15 | 0 | 0 | 5 | 0 | 0 | QCT | 0.0171 | 2 |
| ACl 4 | 225 | 3000 | 15 | 0 | 0 | 5 | 0 | 0 | QCT | 0.0057 | 0 |
| ACl 4 | 225 | 3000 | 15 | 0 | 0 | 5 | 0 | 0 | QCT | 0.006 | 0 |

As shown in Table 36 the inhibitors made in accordance with the present invention (inhibitor numbers 1, 2, and 3) were slightly worse than the prior art inhibitor (inhibitor number 4) in terms of corrosion rate and had similar evidence of pitting for Quality coiled tubing in 12% HCl/3% HF acid.

TABLE 36

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 225 | 3000 | 12 | 3 | 0 | 4 | 0 | 0 | QCT | 0.0139 | 0 |
| ACl 1 | 225 | 3000 | 12 | 3 | 0 | 4 | 0 | 0 | QCT | 0.0139 | 0 |
| ACl 2 | 225 | 3000 | 12 | 3 | 0 | 4 | 0 | 0 | QCT | 0.0155 | 0 |
| ACl 2 | 225 | 3000 | 12 | 3 | 0 | 4 | 0 | 0 | QCT | 0.0107 | 0 |
| ACl 3 | 225 | 3000 | 12 | 3 | 0 | 4 | 0 | 0 | QCT | 0.0197 | 1 |
| ACl 3 | 225 | 3000 | 12 | 3 | 0 | 4 | 0 | 0 | QCT | 0.0168 | 1 |
| ACl 4 | 225 | 3000 | 12 | 3 | 0 | 4 | 0 | 0 | QCT | 0.0109 | 0 |
| ACl 4 | 225 | 3000 | 12 | 3 | 0 | 4 | 0 | 0 | QCT | 0.0072 | 0 |

As shown in Table 37 the inhibitors made in accordance with the present invention (inhibitor numbers 1, 2, and 3) were similar to the prior art inhibitor (inhibitor number 4) in terms of both corrosion rate and evidence of pitting for Quality coiled tubing in 6% HCl/1.5% HF acid.

TABLE 37

| Inhibitor | Deg F. | PSIG | % HCl | % HF | Alternative Acid | gpt ACI | % Formic | ppt KI | Metal | $C_{R\ Rate}$ lbs./ft. sq. | Pitting |
|---|---|---|---|---|---|---|---|---|---|---|---|
| ACl 1 | 225 | 3000 | 6 | 1.5 | 0 | 4 | 0 | 0 | QCT | 0.0065 | 0 |
| ACl 1 | 225 | 3000 | 6 | 1.5 | 0 | 4 | 0 | 0 | QCT | 0.0073 | 0 |
| ACl 2 | 225 | 3000 | 6 | 1.5 | 0 | 4 | 0 | 0 | QCT | 0.0049 | 0 |
| ACl 2 | 225 | 3000 | 6 | 1.5 | 0 | 4 | 0 | 0 | QCT | 0.0052 | 0 |
| ACl 3 | 225 | 3000 | 6 | 1.5 | 0 | 4 | 0 | 0 | QCT | 0.0047 | 0 |
| ACl 3 | 225 | 3000 | 6 | 1.5 | 0 | 4 | 0 | 0 | QCT | 0.0051 | 0 |
| ACl 4 | 225 | 3000 | 6 | 1.5 | 0 | 4 | 0 | 0 | QCT | 0.0049 | 0 |
| ACl 4 | 225 | 3000 | 6 | 1.5 | 0 | 4 | 0 | 0 | QCT | 0.0047 | 0 |

Referring now to FIG. 1, a graphical comparison of the new ACI #1 against prior art ACI #4 shows that ACI #1 does not crosslink cationic polyacrylamide acid-gel solutions. Tests were conducted on Fann 50c rheometers at 170 sec-1 and 275° F. for 180 minutes with gelled acid systems containing the following compositions:

|  | Gelled Acid System with ACI #1 0.55% by wt in 28% HCl | Gelled Acid System with ACI #4 0.55% by wt in 28% HCl |
|---|---|---|
| HCl Acid | 28% by wt HCl in $H_2O$ | 28% by wt HCl in $H_2O$ |
| Polymer | 52 lb of cationic polyacrylamide per 1000 gal of 28% HCl | 52 lb of cationic polyacrylamide per 1000 gal of 28% HCl |
| ACI | 1% by vol of ACI #1 in 28% HCl | 1% by vol of ACI #4 in 28% HCl |

Examination of FIG. 1 shows the plot of viscosity versus time for two gelled acid systems with the ACI being the only variable. Results for the prior art ACI #4 shows an undesirable viscosity increase of 2 to 3 times the initial desired viscosity. Results for the new ACI #1 gives essentially constant viscosity over a 180 minute time period. It is well know to those practicing the art of Acid Corrosion Inhibition (ACI's) that inclusion of aldehyde compounds cause this viscosity increase. However, even though the new ACI #1 contains a significant concentration of the cinamic aldehyde, the synergistic combination with an organo sulfur compound blocks this reaction of polyacrylamide and aldehyde.

In practice, the inhibitor may be added at the well head with the acid solution. Further, potassium iodide is utilized, the inhibitor, acid solution and potassium iodide source may be added together at the well head. No special procedures are required.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A corrosion inhibitor comprising:
cinnamaldehyde and at least one organo-sulfur compound selected from the group consisting of thioethanol, 1-thio-2-butanol 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, tetramethylthiuramn monosulfide, thiazolidine, thioglycerol, cysteine, cystine, methionine, and thiourea; and wherein the inhibitor is free of alkylphenyl ethoxy compounds.

2. The corrosion inhibitor of claim 1 further comprising iodine.

3. The corrosion inhibitor of claim 1 further comprising an extender selected from the group consisting of potassium iodide, formic acid and mixtures thereof.

4. The corrosion inhibitor of claim 1 further comprising a salt selected from the group consisting of alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline quaternary salt, benzoquinoline quaternary salt, chloromethyl napthalene quaternary salt and mixtures thereof.

5. A composition for stimulating production of petroleum wells comprising:
   an acid, and a corrosion inhibitor comprising cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipronionic acid, glycol dimercaptoacetate, mercaptosuccinic acid, sodium tetrathionate, tetramethylthiuram monosulfide, thiazolidine, thioglycerol, cysteine, cystine, methionine, and thiourea; and wherein the inhibitor is free of alkylphenyl ethoxy compounds.

6. The composition of claim 5 further comprising iodine.

7. The composition of claim 5 further comprising an extender selected from the group consisting of potassium iodide, formic acid and mixtures thereof.

8. The composition of claim 5 wherein the acid is selected from the group consisting of hydrochloric acid, hydrofluoric acid, acetic acid, formic acid, sulfamic acid and mixtures thereof.

9. A method of stimulating production of a water or petroleum well comprising:
   injecting a combination of an acidic composition and a corrosion inhibitor into the well, the corrosion inhibitor comprising cinnamaldehyde and at least one organo-sulfur compound selected from the group consisting of thioethanol, 1-thio-2-butanol, 1,2-ethanedithiol, 1,3-dibutylthiourea, 1,3-diethylthiourea, 2-aminoethanethiol, 2-imino-4-thiobiuret, 2-mercaptobenzothiazole, 2-mercaptothiazoline, ammonium thiosulfate, dithiodipropionic acid, glycol dimercaptoacetate, mercaptosuccinic acid, sodium tetrathionate, tetramethylthiuram monosulfide, thiazolidine, thioglycerol, cysteine, cystine, methionine, and thiourea; and wherein the inhibitor is free of alkylphenyl ethoxy compounds.

10. The method of claim 9 wherein the combination further comprises iodine.

11. The method of claim 9 wherein the combination further comprises an extender selected from the group consisting of potassium iodide, formic acid and mixtures thereof.

12. The method of claim 9 wherein the acid is selected from the group consisting of hydrochloric acid, hydrofluoric acid, acetic acid, formic acid, sulfamic acid and mixtures thereof.

13. A corrosion inhibitor comprising:
   from about 5.0% to about 40% cinnamaldehyde;
   from about 1.0% to about 10% thioethanol;
   from about 5.0% to about 40% benzyl chloride quinoline quaternary salt;
   from about 10% to about 30% of a surfactant;
   from about 0.15% to about 1.5% iodine; and
   from about 10% to about 50% formic acid.

14. The corrosion inhibitor of claim 13 wherein the inhibitor is free of alkylphenyl ethoxy compounds.

15. The corrosion inhibitor of claim 13 further comprising a salt selected from the group consisting of alkylpyridine quaternary salt, chloromethyl napthalene quaternary salt, alkyl pyridine-N-methyl chloride quaternary salt, alkyl pyridine-N-benzyl chloride quaternary salt, quinoline-N-methyl chloride quaternary salt, quinoline-N-benzyl chloride quaternary salt, quinoline-N-(chloro-benzyl chloride) quaternary salt, isoquinoline quaternary salt, benzoquinoline quaternary salt, chloromethyl napthalene quaternary salt and mixtures thereof.

\* \* \* \* \*